Dec. 16, 1969           E. H. TURNER           3,484,151
NONRECIPROCAL OPTICAL DEVICE EMPLOYING BIREFRINGENT
ELEMENTS WITH ROTATING BIREFRINGENT AXES
Filed Jan. 3, 1966

INVENTOR
*E. H. TURNER*

BY
*Kenneth W. Mateer*

ATTORNEY

United States Patent Office 3,484,151
Patented Dec. 16, 1969

3,484,151
A NONRECIPROCAL OPTICAL DEVICE EMPLOYING BIREFRINGENT ELEMENTS WITH ROTATING BIREFRINGENT AXES
Edward H. Turner, Rumson, N.J., assignor to Bell Telephone Laboratories, Incorporated, New York, N.Y., a corporation of New York
Filed Jan. 3, 1966, Ser. No. 518,469
Int. Cl. G02f 1/26, 1/22, 1/24
U.S. Cl. 350—150      3 Claims

ABSTRACT OF THE DISCLOSURE

Nonreciprocal manipulation of optical energy is achieved by passing light through two successive, suitably spaced birefringent plates whose birefringent axes are rotating at angular frequency $\omega$ and are angularly displaced by an angle of $\pi/8$ radians relative to each other.

---

Figure 1:
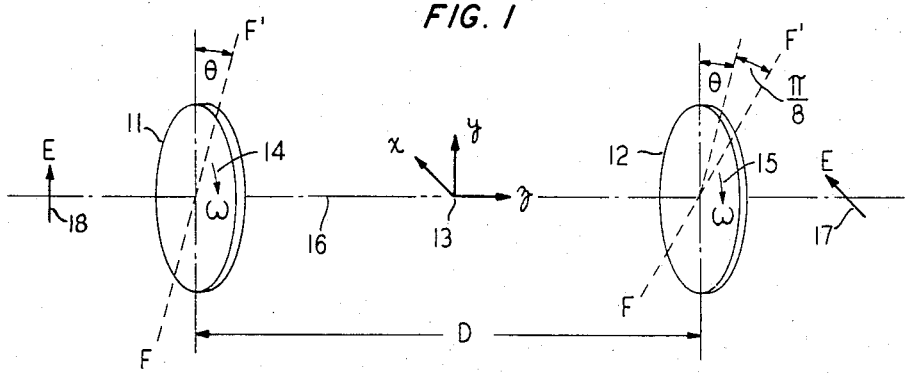

This invention relates to optical frequency wave energy transmission apparatus and, more particularly, to nonreciprocal components such as gyrators and circulators for use at such wavelengths.

The concept of nonreciprocal transmission among two or more wave energy paths is priorly disclosed, for example, in an article entitled "The Behavior and Applications of Ferrites in the Micowave Region" by A. G. Fox, S. E. Miller and M. T. Weiss, which appears at pages 5–103 of the Bell System Technical Journal, January 1955. The recent advent of sources of coherent, substantially monochromatic wave energy at optical frequencies has stimulated the advance of the communications industry in the higher optical frequency range. For example, modulated light beams offer the possibility of extremely broadband communication channels for use in a light communication system. However, many of the system components heretofore available at the prior art microwave frequencies are not adaptable to the higher frequency optical or near optical systems since the propagation of energy in the frequency range from the far infrared, through visible, and into the ultraviolet is governed by optical rather than by microwave considerations.

One such component is the gyrator, in which electromagnetic wave energy propagating in a first direction therethrough experiences a given phase shift, while energy propagating in a second direction therethrough which is opposite to said first direction experiences a phase shift 180 degrees different from said given phase shift. A second such component is the circulator, in which energy applied at a first port appears at a given second port, but energy applied at the given second port appears, not at the first port, but at a third port.

It is therefore an object of the present invention to extend certain nonreciprocal device principles into the optical frequency range.

It is a more specific object of the invention to manipulate light waves nonreciprocally with increased ease.

As disclosed in my copending application Ser. No. 490,958, filed Sept. 28, 1965, and assigned to the assignee of this application, certain nonreciprocal optical devices are disclosed in which energy to be nonreciprocally manipulated is transmitted through a medium which is itself moving with a given velocity in a given direction. The velocity of the light in the medium is dependent upon the velocity of the medium and the light velocity is therefore different in opposite transmission directions. In many circumstances, the requirement of moving media in this fashion may be undesirably difficult to meet.

In accordance with the invention, linearly polarized energy to be nonreciprocally manipulated is transmitted succesively through a first birefringent component with rotating axes of birefringence, means introducing a prescribed time delay, and a second birefringent component similar but not identical to the first. Physically, the energy manipulation can be considered to be either the combination of modulation-delay-demodulation or polarization conversion-delay-polarization conversion. As will become apparent in the detailed explanation, the alternate descriptions are equivalent.

More specifically, the linearly polarized energy is succesively incident upon first and second birefringent half wave plates with axes of birefringence rotating at angular frequency $\omega$. The fast axes of the two plates are related through an angle of $\pi/8$ radians, or 22½ degrees. Between the first and second plates the propagating energy travels a distance D at a velocity $c'$ and therefore accumulates a time delay equal to $D/c'$. Alternatively, the plates can be closely spaced with the requisite delay being introduced by physical means inserted therebetween.

Figure 2:
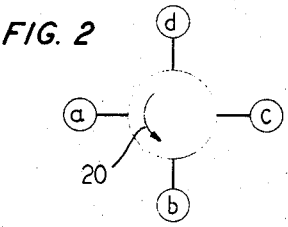
Figure 3:
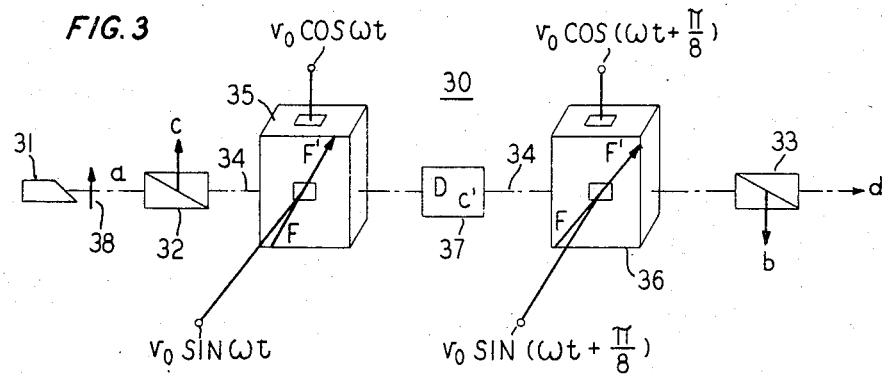

The above and other objects of the invention can be more readily understood by reference to the accompanying drawing and to the detailed description thereof which follows:

In the drawing:
FIG. 1 is a schematic illustration of the invention and its principles of operation;
FIG. 2 depicts the well known circulator symbol; and
FIG. 3 is a semischematic view of a circulator in accordance with the invention.

Referring now to FIG. 1 in greater detail, two half wave plates 11, 12 are illustrated centered on the $z$ axis of rectangular coordinate system 13. Each of plates 11, 12 is birefringent, with the fast axes thereof indicated as dashed lines F–F'. The axes of birefringence of each plate are indicated by arrows 14, 15 to be rotating with an angular velocity $\omega$. While the rotational sense is illustrated as clockwise, this is not intended to be limiting, since simultaneously counterclockwise rotating axes are equally permissible.

Based on the fact that wave energy parallel to the fast axis of a birefringent medium travels with a greater phase velocity than energy perpendicular thereto, a half wave plate is formed by choosing the composition and thickness of plates 11, 12 to produce a 180 degree differential phase shift for wave energy polarized parallel to the fast and slow axes of the plates.

In FIG. 1 the wave energy indicated by arrow 18 to be linearly polarized along the $y$ axis and to be propagating along axis 16 passes through half wave plate 11 when its fast axis is at an arbitrary angle, $\theta$, to the $y$ axis direction. As is now well known, linearly polarized wave energy incident on a half wave plate emerges linearly polarized at an angle $2\theta$ to the original reference axis. Traveling at velocity $c'$ over the distance D the wave energy arrives at half wave plate 12 at a time $D/c'$ later. In accordance with the invention, the fast axis of plate 12 is displaced by $\pi/8$ radian, or 22.5 degrees, from the fast axis of plate 11. Thus, when the linearly polarized wave was initially incident on plate 11 at an angle $\theta$, the fast axis of plate 12 was at $(\theta+\pi/8)$. Accordingly, when the wave is incident on plate 12 the fast axis thereof is at an angle of $$\left(\theta+\frac{\pi}{8}+\omega\frac{D}{c'}\right)$$

to the $y$ axis. By relating the angular velocity $\omega$ and the time delay $D/c'$ so that $\omega D/c'$ equals $\pi/8$ radian, the fast axis of plate 12 will be at an angle of $(\theta+\pi/4)$ to the $y$ axis when the wave polarized at $2\theta$ to the $y$ axis is incident upon it. By substraction, therefore, the polarized wave makes an angle of $$\left(\frac{\pi}{4}-\theta\right)$$

with the fast axis of plate 12. The plate 12 effectively rotates the polarization through twice this angle or $$\left(\frac{\pi}{2}-2\theta\right)$$

Adding the two rotations, $$2\theta+\left(\frac{\pi}{2}-2\theta\right)=\frac{\pi}{2}$$

Thus the incident wave has been rotated 90 degrees and emerges from plate 12 polarized parallel to the $x$ axis, as illustrated by arrow 17.

To demonstrate that the apparatus of FIG. 1 is nonreciprocal, consider that wave energy polarized along the $x$ axis and indicated by arrow 17 is propagating to the left successively through half wave plate 12, delay distance D, and half wave plate 11. By postulating that the fast axis of plate 12 is at an arbitrary angle $$\left(\theta'+\frac{\pi}{8}\right)$$

to the $y$ axis when energy is incident thereon, it is apparent from the priorly stated condition that the fast axis plate 11 is simultaneously at $\theta'$ to the $y$ axis. When the wave traverses delay distance D, however, the axes of plate 11 rotate $\pi/8$ radian and, at incidence thereon, the $$\left(\theta'+\frac{\pi}{8}\right)$$

condition is duplicated. Accordingly, two identical half wave plates are encountered by the propagating wave energy. The sum of two identical half wave plate interactions is a full wave plate interaction which produces no net change in the polarization of the incident energy.

In summary, linearly polarized wave energy propagating from left to right experiences a 90 degree rotation; linearly polarized wave energy propagating from right to left experiences no net rotation at all. For the polarizations chosen, then a $y$ polarized wave traveling in the $+z$ direction is converted into an $x$-polarized wave, while an $x$-polarized wave traveling in the $-z$ direction remains $x$-polarized. Since the angles $\theta$ and $\theta'$ were chosen arbitrarily for purposes of description, the results are general. Furthermore, since the $x$ and $y$ polarizations are orthogonal, spatial separation of the separate beams can be advantageously achieved with polarization selective reflecting means such as prisms.

The combination of the nonreciprocal arrangement of FIG. 1 with polarization selective means will produce an optical circulator, a component widely used in the microwave art. The accepted symbology for a circulator is shown in FIG. 2, in which electromagnetic waves applied at port $a$ are transmitted in the circular fashion indicated by arrow 20 to port $b$; application at $b$ leads to $c$; application at $c$, to $d$; and application at $d$, to $a$. Thus each port is coupled around the circle to only one other port for a given port of application. Accordingly, when energy is applied to any given port, the energy is coupled to a different port from that which if excited would produce an output at the given port.

FIG. 3 depicts apparatus including an optical circulator in accordance with the invention comprising laser source 31, and polarization selective reflectors, or polarizers, 32, 33 separated along axis 34 by the nonreciprocal arrangement of FIG. 1, illustrated in more detailed form. Thus half wave plate 36 is spaced apart along axis 34 from half wave plate 35 with delay means 37 interposed therebetween.

Source 31 can be any of the now well known solid state, liquid, or gaseous lasers which produce coherent optical frequency waves which are linearly polarized as indicated by arrow 38. For example, the active medium of laser 31 can be a gaseous mixture of helium and neon enclosed in an elongated tube which is itself positioned within a resonant cavity, not shown. For a detailed discussion of lasers, see the article by A. Yariv and J. P. Gordon entitled "The Laser," published in the January 1963 issue of the Proceedings of the Institute of Radio Engineers. The polarizers 32, 33 can advantageously comprise well known Nicol prisms as described on pages 500 to 502 of the third edition of Fundamentals of Optics by F. A. Jenkins and H. E. White.

Half wave plates 35, 36 must have axes F-F′ rotating at a rate determined by the delay 37 inserted therebetween. For a delay introduced solely by propagation time over a distance of one meter, the axes must rotate at $18.75 \times 10^6$ revolutions per second, a speed which is too high for mechanically rotated elements. Accordingly, plates 35, 36 advantageously comprise electrooptic cubic crystals having a three fold axis such as gallium arsenide, cuprous chloride, gallium phosphide, or hexamethylene tetramine; or a uniaxial crystal having a threefold axis such as lithium methaniobate or quartz. Each of these materials is properly birefringent and which has axes of birefringence which can be electrically rather than mechanically rotated. In FIG. 3, electrical driving signals are applied to each of the plates simultaneously. The required $\pi/8$ differential in angular position of the axes of birefringence can be introdcced by selecting identical electrooptic crystals and by providing the necessary delay electrically as indicated in FIG. 3. Alternatively, the crystals can be initially positioned with the axes properly offset, and the drive signal to each can be identical in both phase and amplitude.

In general the modulating frequencies required to rotate the axes are in the range of $10^7$ or $10^8$ cycles per second. This requirement is relatively easy to meet due to the essentially zero bandwith required. It is also possible to take advantage of acoustic resonances excited within the birefringent materials by the inverse piezoelectric effect. Such resonances are typically undesirable in broadband optical systems but in this application the fact of zero bandwidth permits them with a consequent order of magnitude reduction in the required driving voltage, typically of the order of 100 volts.

In the operation of the circulator of FIG. 3 linearly polarized wave energy polarized vertically as shown by arrow 38 is incident upon prism 32 at port $a$ and is transmitted thereby to and through the nonreciprocal section. Emerging with a horizontal polarization, the energy is deflected from axis 34 by prism 33 and emerges at port $b$. Horizontally polarized energy introduced at port $b$ is deflected by prism 33 into the birefringent section from which it emerges still horizontally polarized, thereby being deflected by prism 32 toward port $c$. If, however, horizontally polarized energy is introduced at port $c$, the 90 degree rotation experienced upon traversal of section 35, 37, 36 produces a vertically polarized output at port $d$. Similarly, a vertically polarized wave incident at port $d$ will emerge still vertically polarized at port $a$. Thus circulator action has been demonstrated.

The above description has been given with reference to the effects of half wave retardation plates on linearly polarized wave energy, a description which is both accurate and graphic. As mentioned hereinbefore, at least one alternate description is possible. Returning therefore briefly to FIG. 1, the initial linear polarization can be considered in well known fashion to comprise two circularly polarized waves of frequency $\beta$ rotating in opposite directions. Rotating half wave plate 11 acts as a single sideband generator for each of the two circularly polarized waves. The wave emerging from plate 11 comprises one circularly polarized wave at frequency $(\beta+2\omega)$ and a second oppositely circularly polarized wave at a frequency $(\beta-2\omega)$. The wave whose frequency was increased by the first plate experiences a frequency decrease at the second, and conversely. The resultant energy emerging from plate 12 comprises two oppositely rotating circularly polarized waves at the original frequency $\beta$, which can of course be combined into a single linear polarization at an angle determined by the delay distance D, the velocity of propagation $c'$, and by the orientation of the axes F–F'. In the present arrangement the net rotation will be 90 degrees. According to this explanation, the nonreciprocal behavior of the device in accordance with the invention can be described as modulation plus delay plus demodulation. A dispersive medium can be disposed in the delay region to enhance the effect by delaying one circular polarization more than the other.

What is claimed is:

1. Apparatus for nonreciprocally propagating coherent linearly polarized light along a given axis of polarization comprising:
   first birefringent means having a fast axis of birefringence rotating at angular frequency $\omega$ disposed on said axis,
   second birefringence means along said axis having a fast axis of birefringence rotating at angular frequency $\omega$,
   the fast axes of said first and second birefringent means being shifted an amount $\pi/8$ radian relative to each other,
   and means for introducing a delay to wave energy propagating with a velocity $c'$ between said first and second birefringent means, said delay being equal to $\pi c'/8\omega$ 2. The combination according to claim 1 in which said first and second means comprise half wave plates of electrooptic material.

3. An optical circulator comprising a first polarizer for transmitting incident light of orthogonal polarizations along different directions;
   a second polarizer for transmitting incident light of orthogonal polarizations along different directions spaced away from said first polarizer along the axis of propagation of light transmitted therebetween;
   nonreciprocal light transmission means disposed on said axis between said first and second polarizers, said nonreciprocal means comprising first and second birefringent plates having fast axes shifted with respect to each other an amount equal to $\pi/8$ radian and rotating at angular frequency $\omega$,
   and means for introducing a delay equal to $\pi c'/8\omega$ disposed between said first and second birefringent plates, where $c'$ is the velocity of said light.

References Cited

UNITED STATES PATENTS

| | | | |
|---|---|---|---|
| 3,267,804 | 8/1966 | Dillon | 350—151 |
| 3,369,122 | 2/1968 | Buhrer | 350—159 X |

DAVID SCHUNBERG, Primary Examiner

P. R. MILLER, Assistant Examiner

U.S. Cl. X.R.

350—151, 157, 159, 160